(12) United States Patent
Sampathkumar (10) Patent No.: US 12,445,956 B2
(45) Date of Patent: Oct. 14, 2025

(54) COMPUTERIZED SYSTEMS AND METHODS FOR AN ENERGY AWARE ADAPTIVE NETWORK

(71) Applicant: PLUME DESIGN, INC., Palo Alto, CA (US)

(72) Inventor: Badri Srinivasan Sampathkumar, Fremont, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 441 days.

(21) Appl. No.: 18/295,451

(22) Filed: Apr. 4, 2023

(65) Prior Publication Data

US 2024/0340787 A1    Oct. 10, 2024

(51) Int. Cl.
*H04L 5/00* (2006.01)
*H04W 52/02* (2009.01)

(52) U.S. Cl.
CPC .............. *H04W 52/0206* (2013.01)

(58) Field of Classification Search
CPC . H04W 52/0216; H04W 76/28; H04W 76/27; H04W 84/12; H04W 4/027; H04W 4/029; H04W 56/002; H04W 56/0055; H04W 56/0015; G06Q 10/0834; G06Q 10/08355
See application file for complete search history.

(56) References Cited

U.S. PATENT DOCUMENTS

| 12,020,202 B2* | 6/2024 | Kunjukrishnan .... G06Q 10/083 |
| 2017/0272317 A1 | 9/2017 | Singla et al. |
| 2021/0195443 A1 | 6/2021 | Agarwal et al. |
| 2022/0330146 A1* | 10/2022 | Kanamarlapudi .... H04W 76/28 |

OTHER PUBLICATIONS

International Search Report and Written Opinion to corresponding International Application No. PCT/US23/17533 mailed Jul. 10, 2023 (7 pages).

* cited by examiner

*Primary Examiner* — Phuoc H Doan
(74) *Attorney, Agent, or Firm* — Nicholas Martin; Greenberg Traurig, LLP (57) ABSTRACT

Disclosed are systems and methods that provide a computerized network management framework that adaptively configures hardware components providing a network at a location based on determined intelligence about the location, including behavioral patterns of users in/around the location. The framework can automatically, in a dynamic manner, trigger and toggle between operational modes of the network so as to provide or offer the necessary network capacity and coverage for current demands on the network. The framework enables a computerized balance between network performance and power savings by configuring the network hardware to operate at power levels specific to the current needs of the network's connected devices. Thus, the disclosed framework provides mechanisms for varying operational modes that meet the threshold needs of network requests, thereby ensuring expected performance of the network is maintained while reducing the power strain on the network components.

20 Claims, 7 Drawing Sheets

COMPUTERIZED SYSTEMS AND METHODS FOR AN ENERGY AWARE ADAPTIVE NETWORK

FIELD OF THE DISCLOSURE

The present disclosure is generally related to network management, and more particularly, to a decision intelligence (DI)-based computerized framework for deterministically managing a network, its wireless and hardwired components and the energy consumption by associated access points of the network.

BACKGROUND

Conventional mechanisms, protocols and implementations of modern network management are focused on network capacity and coverage. For example, current protocols are directed to whether adequate bandwidth is available for connected devices, and/or whether the network spans a desired particular geographic area.

SUMMARY OF THE DISCLOSURE

Moreover, conventional energy management for devices providing and/or operating on a network is treated as a chipset problem That is, current techniques for managing power consumption on a network is addressed at the device-level through attempts of reducing a device's days of use (DoU) value (e.g., how long can the device operate before requiring a charge). However, this simply evokes mechanisms for preserving or extending the life of the device's battery between charges, and does not impact how access points (APs) for a network consume energy.

Thus, according to some embodiments, the disclosed systems and methods provide a novel computerized network management framework that adaptively configures hardware components providing a network at a location based on determined intelligence about the location, including behavioral patterns of users in/around the location.

In some embodiments, as discussed herein, a location can refer to any type of definable geographic area that is capable of being fitted and/or hosting a wireless network (e.g., WiFi), such as, but is not limited to, a home, office, airport, park, building, garage, patio, airplane, train, and the like.

Accordingly, while the discussion herein may reference a WiFi network, it should not be construed as limiting as reference to a WiFi network is provided as a non-limiting example of a network. Thus, one of skill in the art should recognize that any type of known or to be known network, inclusive of known or to be known network components, can be managed, controlled and implemented via the disclosed systems and methods without departing from the scope of the instant disclosure.

For example, a network can be, but is not limited to, any type of wireless network, wireline network, cellular network, and the like, as discussed below at least in relation to network 104 of FIG. 1. Moreover, the disclosed systems and methods can be implemented to control any type of network components related to such networks, their access points and other network providing hardware, including, but not limited to, ethernet ports, connection interfaces, cable interfaces, and the like.

According to some embodiments, as discussed herein, the disclosed framework can automatically, in a dynamic manner, trigger and toggle between operational modes of the network so as to provide or offer the necessary network capacity and coverage for current demands on the network. The disclosed framework enables a computerized balance between network performance and power savings by configuring the network hardware to operate at power levels specific to the current needs of the network's connected devices. Thus, rather than simply extending a network to its maximum coverage and capacity capabilities, as in conventional systems, which leads to unnecessary energy drains on the network components, the disclosed framework provides mechanisms for varying operational modes that meet the threshold needs of network requests, thereby ensuring expected performance of the network is maintained while alleviating the power strain on the network components.

As discussed herein, the disclosed framework can adaptively provide a network via automatically configured network components that meet the actual usage needs of connected devices, which provides network and hardware-based capabilities for energy consumption not currently available from conventional systems.

According to some embodiments, a method is disclosed for a DI-based computerized framework for deterministically managing a network, its wireless and hardwired components and the energy consumption by associated access points of the network. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for deterministically managing a network, its wireless and hardwired components and the energy consumption by associated access points of the network.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the." again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. By way of background, current implementations of network management for a location are based on two (2) key metrics: i) maximizing offered network capacity; and ii) maximizing network coverage. However, such metrics, as well as currently known mechanisms for network management, fail to account for power optimization via a provided power consumption awareness in the network. As mentioned above, this can potentially lead to an unnecessary over-use of energy due to the over provisioning of a network and its associated components that is not commensurate with the needs of the devices at that location.

For example, a location may have three (3) Internet of Things (IoT) devices that need <3 Mbps of maximum network bandwidth, two (2) laptops that may be needing <50 Mbps of maximum bandwidth and two (2) other devices that consume to the order of 20-25 Mbps of network bandwidth. Even if all the devices are active at the same time at this location, the total network bandwidth required may not exceed 100 Mbps. Thus, if the network is provisioned to provide a maximum of 400 Mbps, there are several multiples of capacity for this location being unused, which leads to wasted power consumption of the hardware components providing the network at the location.

Accordingly, as discussed herein, the disclosed framework can identify current needs of the connected devices on the network, and adaptively configure the network components to reduce their power drain and reduce the provided network characteristics to fit the current demand on the network. Thus, while the example network is capable of providing 400 Mbps, via the disclosed functionality of the provided framework, only ~100 Mbps may be provided.

In some embodiments, the provided capacity can be dynamically and automatically manipulated as demand on the network changes, which can be based on real-time (or near real-time) network data and/or behavioral patterns, as discussed herein.

Therefore, according to some embodiments, the disclosed framework can operate based on a dynamically determined and monitored Quality of Experience (QoE) metric or value. The QoE can provide an indication as to the current and/or predicted health of the network and quality of experience based on the "need" (or maximum capacity) and "usage" of the connected devices (e.g., client devise, pods, apps, and the like). As discussed in more detail below, at least in relation to FIG. 4, the QoE can be determined and leveraged to provision the network according to specific operational modes that can adaptively scale network capacity and coverage for real-world and digital activities currently occurring at the location.

Figure 1:
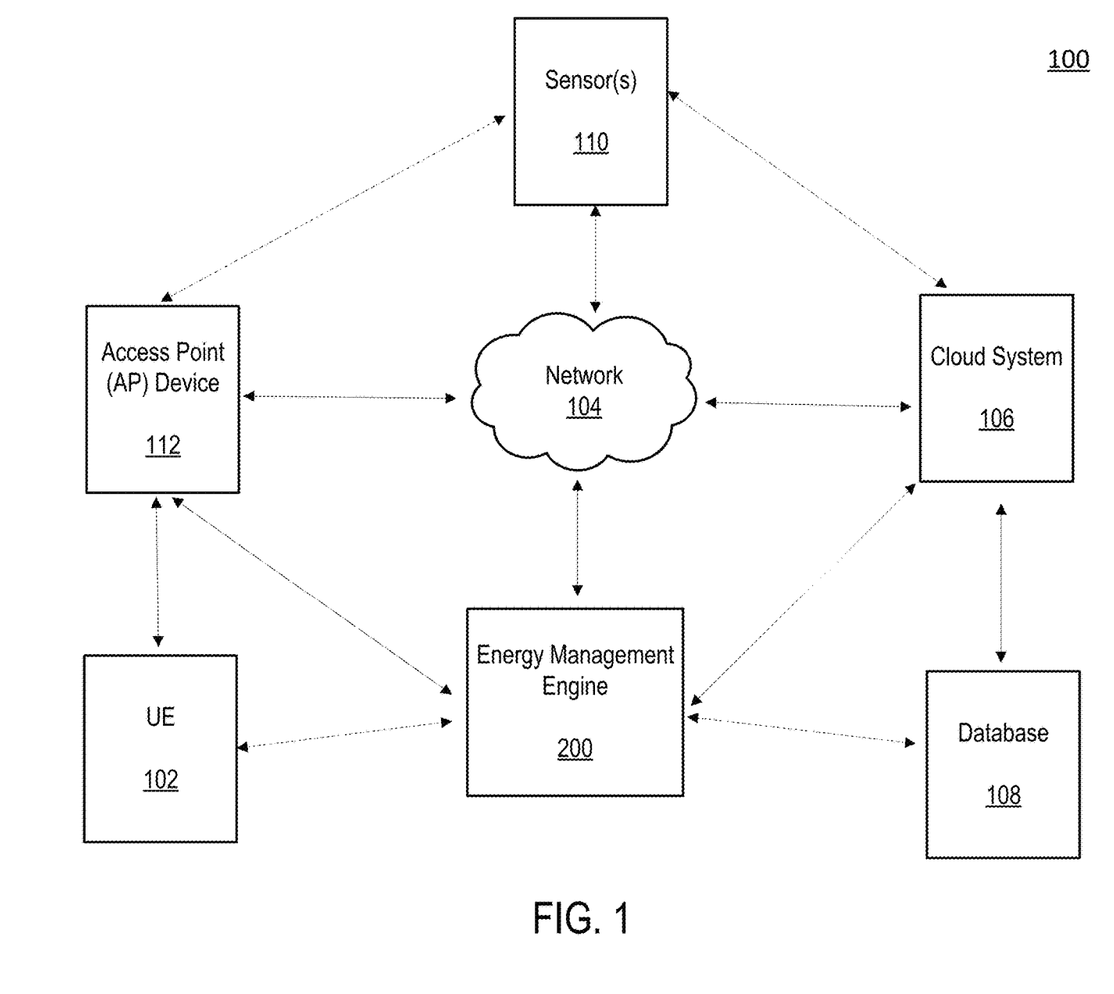
FIG. 1 is a block diagram of an example configuration within which the systems and methods disclosed herein could be implemented according to some embodiments of the present disclosure.

With reference to FIG. 1, system 100 is depicted which includes user equipment (UE) 102 (e.g., a client device, as mentioned above and discussed below in relation to FIG. 7), access point (AP) device 112, network 104, cloud system 106, database 108, sensors 110 and energy management engine 200. It should be understood that while system 100 is depicted as including such components, it should not be construed as limiting, as one of ordinary skill in the art would readily understand that varying numbers of UEs, AP devices, peripheral devices, sensors, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, IoT device, autonomous machine, and any other device equipped with a cellular or wireless or wired transceiver.

In some embodiments, peripheral device (not shown) can be connected to UE 102, and can be any type of peripheral device, such as, but not limited to, a wearable device (e.g., smart watch), printer, speaker, sensor, and the like. In some embodiments, peripheral device can be any type of device that is connectable to UE 102 via any type of known or to be known pairing mechanism, including, but not limited to, WiFi, Bluetooth™, Bluetooth Low Energy (BLE), NFC, and the like.

According to some embodiments, AP device 112 is a device that creates a wireless local area network (WLAN) for the location. According to some embodiments, the AP device 112 can be, but is not limited to, a router, switch, hub and/or any other type of network hardware that can project a WiFi signal to a designated area. In some embodiments, UE 102 may be an AP device.

According to some embodiments, sensors 110 can correspond to any type of device, component and/or sensor associated with a location of system 100 (referred to, collectively, as "sensors"). In some embodiments, the sensors 110 can be any type of device that is capable of sensing and capturing data/metadata related to activity of the location. For example, the sensors 110 can include, but not be limited to, cameras, motion detectors, door and window contacts, heat and smoke detectors, passive infrared (PIR) sensors, time-of-flight (ToF) sensors, and the like. In some embodiments, the sensors can be associated with devices associated with the location of system 100, such as, for example, lights, smart locks, garage doors, smart appliances (e.g., thermostat, refrigerator, television, personal assistants (e.g., Alexa®, Nest®, for example)), smart phones, smart watches or other wearables, tablets, personal computers, and the like, and some combination thereof. For example, the sensors 110 can include the sensors on UE 102 (e.g., smart phone) and/or peripheral device (e.g., a paired smart watch). In some embodiments, sensors 110 can be associated with any device connected and/or operating on cloud system 106 (e.g., a cloud-based device, such as a server that collects information related to the location, for example).

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via engine 200) the energy management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP device 112, sensors 110, and the services and applications provided by cloud system 106 and/or energy management engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
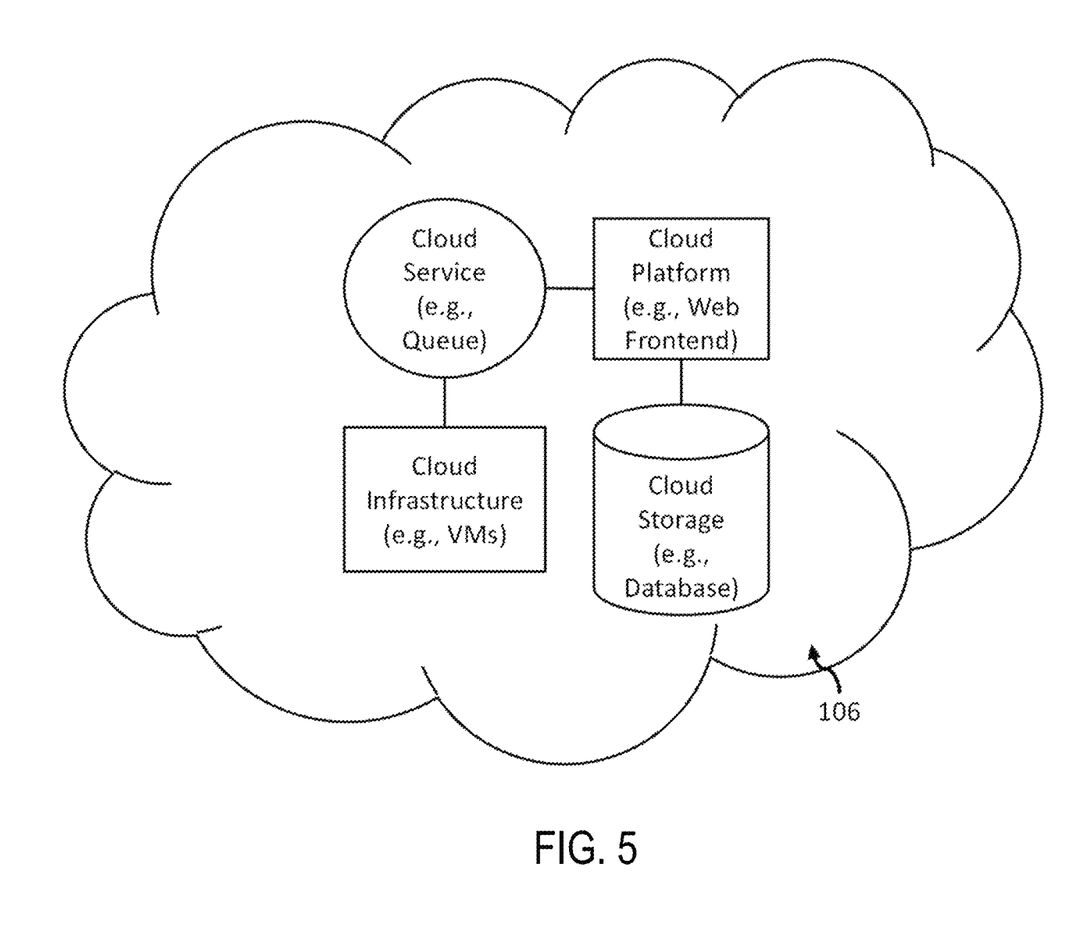
FIG. 5 depicts an exemplary implementation of an architecture according to some embodiments of the present disclosure.
Figure 6:
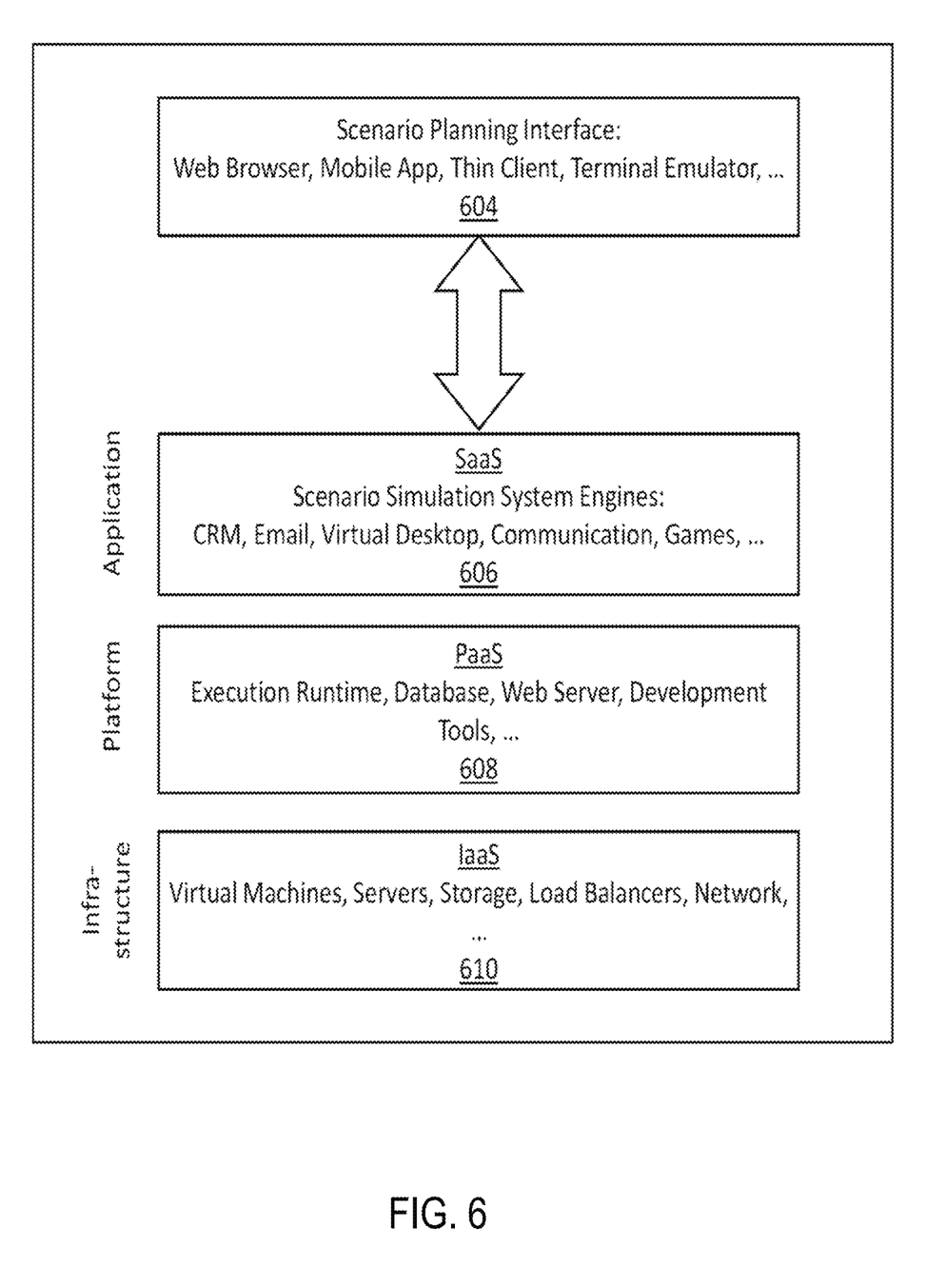
FIG. 6 depicts an exemplary implementation of an architecture according to some embodiments of the present disclosure.

Turning to FIGS. 5 and 6, in some embodiments, the exemplary computer-based systems/platforms, the exemplary computer-based devices, and/or the exemplary computer-based components of the present disclosure may be specifically configured to operate in a cloud computing/architecture 120 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository Energy management engine 200, as discussed above and further below in more detail, can include components for the disclosed functionality. According to some embodiments, energy management engine 200 may be a special purpose machine or processor, and can be hosted by a device on network 104, within cloud system 106, on AP device 112 and/or on UE 102. In some embodiments, engine 200 may be hosted by a server and/or set of servers associated with cloud system 106.

According to some embodiments, as discussed in more detail below, energy management engine 200 may be configured to implement and/or control a plurality of services and/or microservices, where each of the plurality of services/microservices are configured to execute a plurality of workflows associated with performing the disclosed energy management. Non-limiting embodiments of such workflows are provided below in relation to at least FIGS. 3-4.

According to some embodiments, as discussed above, energy management engine 200 may function as an application provided by cloud system 106. In some embodiments, engine 200 may function as an application installed on a server(s), network location and/or other type of network resource associated with system 106. In some embodiments, engine 200 may function as application installed and/or executing on AP device 112, UE 102 and/or sensors 110. In some embodiments, such application may be a web-based application accessed by AP device 112, UE 102 and/or devices associated with sensors 110 over network 104 from cloud system 106. In some embodiments, engine 200 may be configured and/or installed as an augmenting script, program or application (e.g., a plug-in or extension) to another application or program provided by cloud system 106 and/or executing on AP device 112, UE 102 and/or sensors 110.

Figure 2:
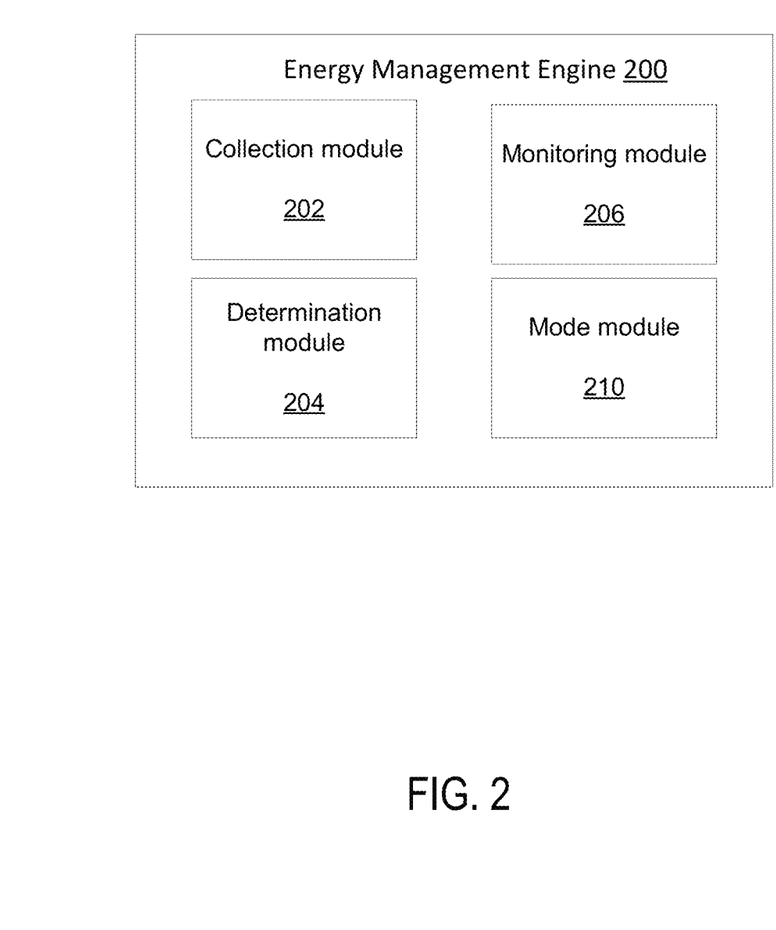
FIG. 2 is a block diagram illustrating components of an exemplary system according to some embodiments of the present disclosure.

As illustrated in FIG. 2, according to some embodiments, energy management engine 200 includes collection module 202, determination module 204, monitoring module 206 and mode module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
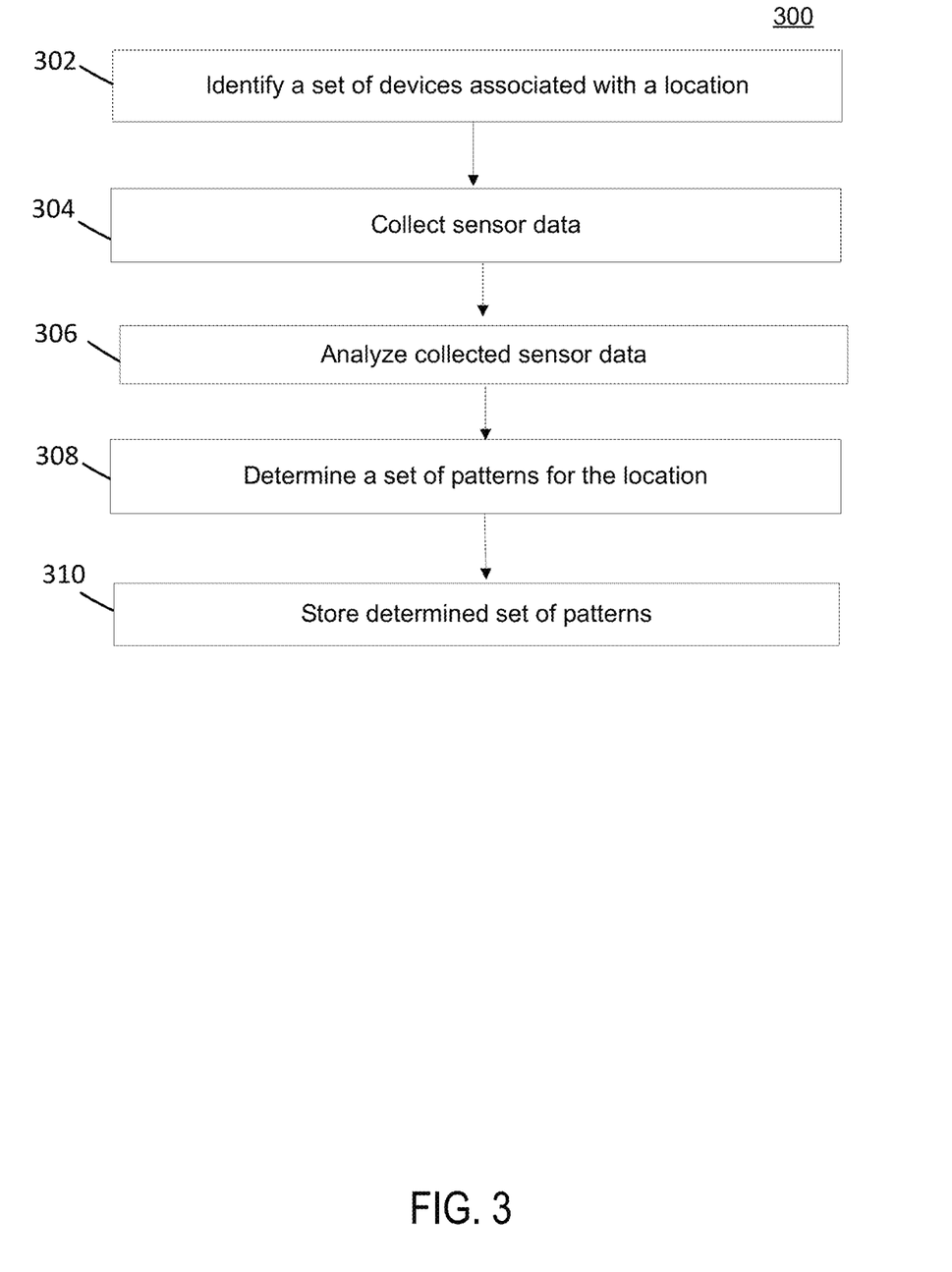
FIG. 3 illustrates an exemplary workflow according to some embodiments of the present disclosure.

Turning to FIG. 3, Process 300 provides non-limiting example embodiments for the disclosed energy management framework. According to some embodiments, Process 300 provides the executable steps for collecting data about the location, which as discussed below in relation to Process 400 of FIG. 4, enables the adaptive management of the network and its associated energy/power management/control.

According to some embodiments, Steps 302-304 of Process 300 can be performed by collection module 202 of energy management engine 200; and Steps 306-310 can be performed by determination module 204.

According to some embodiments, Process 300 begins with Step 302 where a set of devices for a location are identified. For example, Step 302 can involve the identification of UE 102 for each user at the location, and the associated sensors 110. Thus, additional, non-limiting examples of devices at a location, and the types of collectable data via such devices are discussed above at least in relation to FIG. 1.

In some embodiments, Step 302 can involve establishing a connection with and/or between such devices (e.g., establish a connection with the set of devices and engine 200). For example, if AP device 112 is executing engine 200, then UE 102 and sensors 110 (e.g., the set of devices identified in Step 302) are to be connected to AP device 112/engine 200. According to some embodiments, engine 200 can operate as a centralized network manager for a location. Thus, in some embodiments, Step 302 can involve the configuration of each identified sensor and its pairing/connection with engine 200 and/or each other.

Accordingly, in some embodiments, with reference to FIG. 1, for example, sensors 110 can be paired with each other, with UE 102, with engine 200 and/or with AP device 112, which can be paired via connectivity protocols provided and/or enabled via engine 200. For example, a motion sensor 110 can be paired/connected with another sensor 110, engine 200, AP device 112 and/or UE 102 via WiFi or BLE technology. In some embodiments, the sensors 110 can be paired and/or connected with another sensor 110, engine 200, AP device 112 and/or UE 102 via a physical wire connection (e.g., fiber, ethernet, coaxial, and/or any other type of known or to be known wiring to hardwire a home for network connectivity for devices operating therein). In some embodiments, the sensors 110 can be paired/connected with another sensor 110, engine 200, AP device 112 and/or UE 102 via a cloud-to-cloud (C2C) connection (e.g., establish connection with a third party cloud, which connects with cloud system 106, for example). In some embodiments, the sensors 110 can be paired/connected via a combination of network capabilities, hard wiring and/or C2C. In some embodiments, the sensors 110 can be paired so as enable an extended reach of the sensor's configuration to detect specific types of events.

In Step 304, engine 200 can operate to trigger the identified devices to begin collecting location/activity data (referred to as "sensor data"). According to some embodiments, such data can be collected continuously and/or according to a predetermined period of time or interval. In some embodiments, the data may be collected based on detected events. In some embodiments, type and/or quantity of data may be directly tied to the type of sensor. For example, a door contact sensor may only collect sensor data when an associated door is opened (e.g., an open event, which can indicate, but is not limited to, the identity of the door, time of opening, time of closing, duration of opening, quantity of opening, and the like, or some combination thereof). In another non-limiting example, a gyroscope sensor on a user's smartphone can detect when a user is moving, and the type and/or metrics of such movements.

According to some embodiments, the sensor data can include information related to, but not limited to, network usage (e.g., downloads, uploads, network resources accessed (e.g., web pages) and the like, which can be specific to a location, AP, application and/or user, or some combination thereof), types of applications, types of devices, user identity, user motions/movements, user biometrics, and the like, or some combination thereof.

In some embodiments, the collected sensor data in Step 304 can be stored in database 108 in association with an identifier (ID) of a user, location and/or account of the user/location.

In Step 306, engine 200 can analyze the collected sensor data. According to some embodiments, engine 200 can implement any type of known or to be known computational analysis technique, algorithm, mechanism or technology to analyze the collected sensor data from Step 304.

In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the sensor data, as discussed herein.

According to some embodiments, the AI/ML computational analysis algorithms implemented can be applied and/or executed in a time-based manner, in that collected sensor data for specific time periods can be allocated to such time periods so as to determine patterns of activity (or non-activity) according to a criteria. For example, engine 200 can execute a Bayesian determination for a 24 hour span every 8 hours, so as to segment the day according to applicable patterns, which can be leveraged to determine, derive, extract or otherwise activities/non-activities in/around a location.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:
  a. define Neural Network architecture/model,
  b. transfer the input data to the neural network model,
  c. train the model incrementally,
  d. determine the accuracy for a specific number of timesteps,
  e. apply the trained model to process the newly-received input data,
  f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 308, based on the analysis from Step 306, engine 200 can determine a set of patterns for the location. In some embodiments, the patterns can be specific to a user or users, and/or can be associated with portions of the location. For example, the patterns can indicate that user A performs typically streams movies on his phone each weeknight from 8 μm to 10 μm in her bedroom; and user B video chats with her friends from 5 μm to 6 μm on the weekend days. In another non-limiting example, a pattern can indicate that the kitchen in a house has at least one person in it during the hours of 7 am-8 am and 5 μm to 6 μm each weekday, and during that time, the smart speaker in the kitchen is streaming a podcast. According to some embodiments, the determined patterns are based on the computational AI/ML analysis performed via engine 200, as discussed above.

Accordingly, in some embodiments, the set of patterns can correspond to, but are not limited to, types of events, types of detected activity, a time of day, a date, type of user, duration, amount of activity, quantity of activities, sublocations within the location (e.g., rooms in the house, for example), and the like, or some combination thereof.

For example, a specified pattern of activity for a user may correspond to a specific day of the week, and a specific time. For example, a pattern may correspond to "morning routine" of a user from 6 AM to 7:30 AM, on a Monday, whereby the user is determined as waking up from sleep, walking into the kitchen to make coffee, then moving back to their bedroom to get dressed and leave for work. The pattern can correspond to and/or indicate specific routes within the location (e.g., which rooms are entered and exited, hallways used, and in which order, for example).

In Step 312, engine 200 can store the determined set of patterns in database 108, in a similar manner as discussed above. According to some embodiments, Step 312 can involve creating a data structure associated with each determined pattern, whereby each data structure can be stored in a proper storage location associated with an identifier of the user/location, as discussed above.

In some embodiments, a pattern can comprise a set of events, which can correspond to an activity and/or non-activity (e.g., downloading music content, sending work emails, exercising in the house, cleaning the dishes, sleeping, and the like, for example). In some embodiments, the pattern's data structure can be configured with header (or metadata) that identifies a user or the location, and/or a time period/interval of analysis (as discussed above); and the remaining portion of the structure providing the data of the activity/non-activity. In some embodiments, the data structure for a pattern can be relational, in that the events of a pattern can be sequentially ordered, and/or weighted so that the order corresponds to events with more or less activity.

In some embodiments, the structure of the data structure for a pattern can enable a more computationally efficient (e.g., faster) search of the pattern to determine if later detected events correspond to the events of the pattern, as discussed below in relation to Process 400 of FIG. 4. In some embodiments, the data structures of patterns can be, but are not limited to, files, arrays, lists, binary, heaps, hashes, tables, trees, and the like, and/or any other type of known or to be known tangible, storable digital asset, item and/or object.

According to some embodiments, the sensor data can be identified and analyzed in a raw format, whereby upon a determination of the pattern, the data can be compiled into refined data (e.g., a format capable of being stored in and read from database 108). Thus, in some embodiments, Step 310 can involve the creation and/or modification (e.g., transformation) of the sensor data into a storable format.

In some embodiments, as discussed below, each pattern (and corresponding data structure) can be modified based on further detected behavior, as discussed below in relation to Process 400 of FIG. 4.

Figure 4:
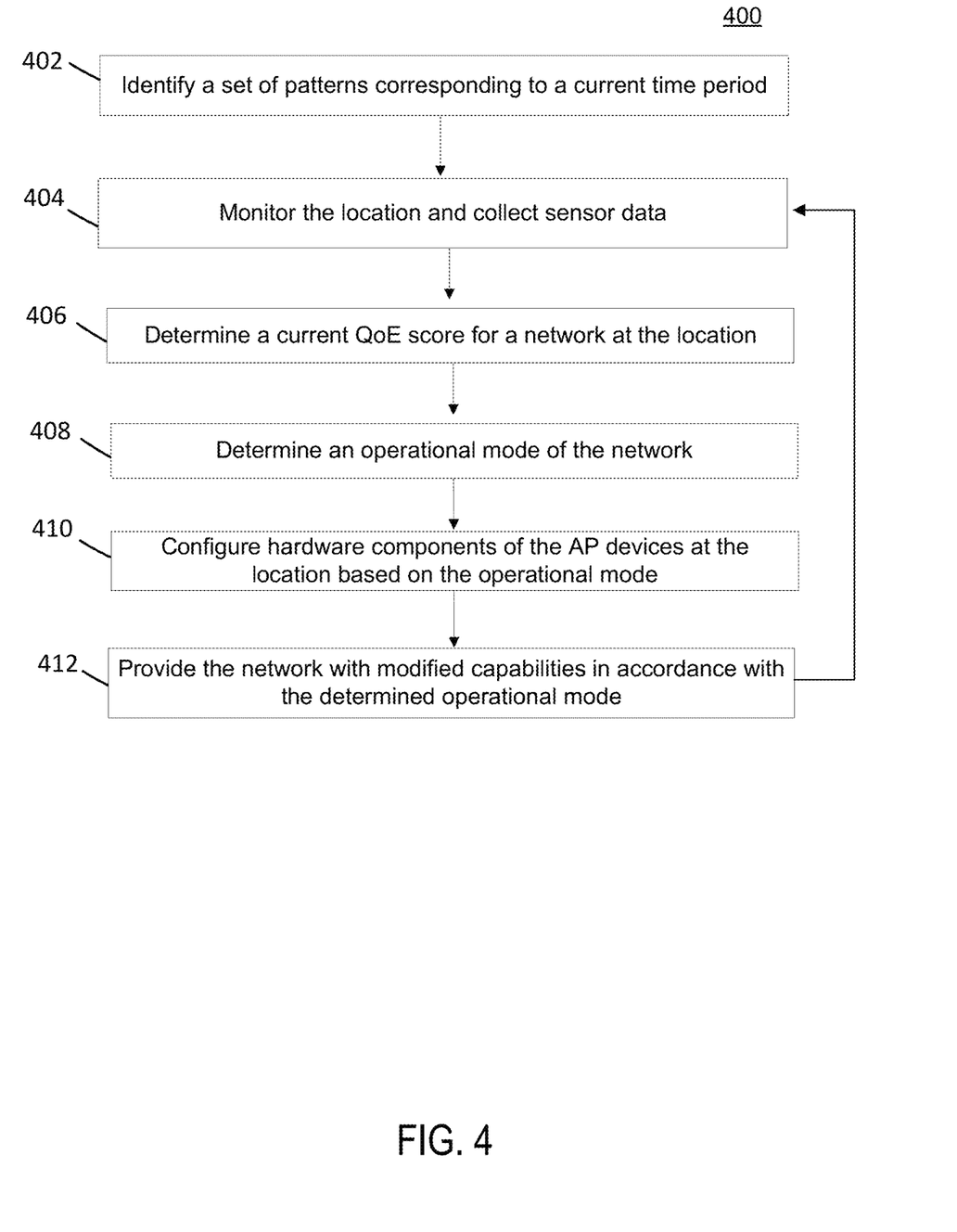
FIG. 4 illustrates an exemplary workflow according to some embodiments of the present disclosure.

Turning to FIG. 4, Process 400 provides non-limiting example embodiments for the deployment and/or implementation of the disclosed energy management framework for a network at a location.

According to some embodiments, as discussed herein, the disclosed framework, via engine 200, provides an energy aware adaptive network (e.g., WiFi) according to a set of operational modes or states, which can be referred to as "Turbo" mode, "Deep Sleep" mode and "Eco" mode. As discussed herein, each mode/state enables a modified network configuration that is commensurate with the needs of the location at specific portions/times of the day, which can be indicated via the location's or network's QoE, as discussed above and in more detail below. Accordingly, in some embodiments, the power savings in various modes ("Eco" and "Deep Sleep") can be achieved by manipulating the hardware and scaling the capabilities of the hardware commensurate with the particular/respective power mode.

It should be understood that while the discussion herein will reference three (3) modes of operation, it should be construed as limiting, as one of skill in the art would understand that additional or fewer modes of operation can be determined and implemented without departing from the scope of the instant disclosure.

As discussed herein, Turbo, Eco and Deep Sleep modes can be customized to specific network usage and/or location-based characteristics so as to enable customized network settings and hardware configurations for each location, which can uniquely optimize each location individually. Indeed, the disclosed modes can be personalized to types and/or identities of users, and/or types and/or identities of locations. For example, a Eco mode for an office building may have higher thresholds than a Eco mode for a college student living in an off-campus apartment.

According to some embodiments, Turbo mode corresponds to a state of a network (e.g., WiFi) where the network components (e.g., AP device 112) can provide the maximum network capacity and coverage. As provided below, Turbo mode enables the network to offer the highest value QoE for anticipated maximum throughput needs. However, Turbo mode provides the lowest value optimization for energy consumption.

In some embodiments, Deep Sleep mode corresponds to a state of a network where the network components are optimized for peak energy consumption. According to some embodiments, Deep Sleep mode can involve the modification of the operational states of components of AP device 112—for example, one or more radios may be turned off. Thus, as discussed below, Deep Sleep mode can involve the network operating at a "bare minimum" required to maintain connectivity of the devices on the network, yet be capped at a threshold capacity.

For example, between the hours of 10 pm and 2 am, only the radios associated with the security cameras may remain active, and all other devices may have their connectivity either throttled or turned off. As discussed herein, this intelligence can be derived from the determined activity patterns from Process 300, discussed supra.

Accordingly, Deep Sleep mode can provide minimum network performance to support operational devices for a time period (e.g., at night) and maximum energy savings during such time period.

In some embodiments, Eco mode refers to the "economic" operation of the network and associated network hardware. Eco mode configures and operates network hardware at levels where the hardware's capabilities are provided to an extent required to meet the detected and/or detected needs of the location (while avoiding a surplus of capacity and coverage). Thus, both the performance and the energy consumption (or savings) of the network components are usage based, and can be dynamically altered to adhere to current network demand.

According to some embodiments, as discussed herein, Eco mode can effectuate power savings via particular configurations of AP device 112. For example, Eco mode (and/or Deep Sleep mode) can involve, but is not limited to, executing an optimization operations (or set of instructions) and selectively switching off certain radios (e.g. switch off 5 GHz or 6 GHz radio at a location), reducing the transmit (Tx) and receive (Rx) number of antenna chains for the various radios at the location, reducing power consumption at the cost of reduced antenna diversity, reducing the channel width used for Tx and/or Rx radios, and the like, or some combination thereof. Accordingly, any type of modification to a network component/hardware that can effectuate modifications to how the network operates (e.g., capacity and coverage) can be implemented without departing from the scope of the instant application.

By way of a non-limiting example, Table 1 below depicts non-limiting example configurations for Eco Mode that indicate power savings that can be achieved by manipulating the Tx/Rx chains of the Access Points.

TABLE 1

| Number of chains (Tx × Rx) | Idle (W) | 84 Mbps (W) | 314 Mbps (W) |
| --- | --- | --- | --- |
| 1 × 1 | 5.4 | 5.9 | 6.3 |
| 2 × 2 | 5.6 | 6 | 6.7 |
| 3 × 3 | 5.9 | 6.5 | 7.2 |
| 4 × 4 | 6.2 | 6.6 | 7.7 |

According to some embodiments, modifications to network components and/or network characteristics can enable modifications to network performance, which can increase/decrease power savings. Accordingly, changes, modifications and/or limits to ports, communications, antennas, CPU speeds, RAM refresh rates, dynamic spatial multiplexing power save (SMPS) mechanisms, websites/applications, and the like, can be utilized to reduce power and reduce network capacity/coverage. For example, ethernet ports of an AP can be altered from 2.5 Gbps to 100 Mbps during a set mode (e.g., Eco mode), which can reduce power consumption while enabling the connected devices the adequate network coverage for their tasks. In another example, cloud communication frequency of the AP can be reduced to a lesser frequency, which can also evidence a reduction in energy usage. In yet another example, RAM refresh rates can be reduced to a lower rate (e.g., during Deep Sleep mode), which can lower the power voltage, thereby saving power. And, in yet another non-limiting example, certain applications can be temporarily blocked to prevent overages (according to a threshold per mode) of network traffic per device, which can also lead to power savings.

According to some embodiments, Steps 402-404 of Process 400 can be performed by monitoring module 206 of energy management engine 200; Step 406 can be performed by determination module 204; and Steps 408-412 can be performed by mode module 208.

According to some embodiments, Process 400 begins with Step 402 where engine 200 can identify a set of patterns (as stored in Step 310, discussed supra). According to some embodiments, the set of patterns can be identified based on a criteria or detected trigger, which can include, but is not limited to, a time, date, motion at the location, lack of activity/motion at the location, network traffic (e.g., being at, below or above a threshold value of network activity), number of connected devices, settings of the AP device 112, settings of the service provider, user input, and the like, or some combination thereof. Accordingly, the set of patterns identified in Step 402 can correspond to a single pattern of activity or a plurality of patterns.

For example, Step 402 can be based on a time being detected, whereby a set of patterns determined for a set of users at the location can be retrieved from storage. For example, at 6 am on a Monday, engine 200 can retrieve the patterns for the residents of a home so that the associated and proper mode of the location's network can be properly provisioned, as discussed herein.

In another example, a sensor at the location can detect movement, which can indicate that a user has entered the location. And, in some embodiments, the identity of the user can be detected, which can be based on analysis of the captured digital representation of the user and/or the connectivity data from the user's device (e.g., a device ID, for example). Thus, the set of patterns for that user (and/or for that time of day at the location) can be retrieved.

In some embodiments, the set of patterns may correspond to and/or identify a preset network mode (e.g., Turbo, Deep Sleep or Eco). Such correlation can be identifiable from a linked-list of data within database 108, within header information of the data structure providing the set of patterns, and/or from other types of data/metadata related to the set of patterns. Thus, in some embodiments, upon identification of the set of patterns, engine 200 can initially set the network of the location to an associated mode.

In Step 404, engine 200 can perform operations of monitoring the location, which can be based on set of patterns identified in Step 402. In some embodiments, such monitoring can be effectuated via the UE 102 and/or sensors 110 of system 100, as discussed above in relation to FIG. 1. For example, engine 200 can collected activity data for a user at the location from their smartphone (e.g., UE 102) and from the motion sensors and cameras at the location (e.g., sensors 110).

In some embodiments, engine 200 can monitor the location continuously, and/or according to a predetermined time interval. In some embodiments, the monitoring and collection of data can be performed via the location's sensors in a similar manner as discussed above at least in relation to Step 304 of Process 300. In some embodiments, the monitoring can involve periodically pinging each or a portion of the sensors at the location, and awaiting a reply. In some embodiments, the monitoring can involve push and/or fetch protocols to collect sensor data from each sensor.

In Step 406, based on the monitoring and collection of sensor data in Step 404, engine 200 can determine a current QoE score for the network at the location. As discussed above, the QoE can provide an indication as to the operational status of the network, and can be utilized so as to enable modifications to the network hardware at the location, which can cause scaling of the network's capabilities and/or implementation.

According to some embodiments, engine 200 can compile the collected sensor data from Step 404, and the information from the identified set of patterns from Step 402, and determine the QoE so as to determine the required/needed usage of the network (e.g., current demands on the network). According to some embodiments, engine 200 can analyze the sensor data and the pattern information via any type of AI/ML model, which can be performed in a similar manner as discussed above at least in relation to Step 306 of Process 300.

In Step 408, engine 200 can determine an operational mode of the network. According to some embodiments, the determined operational mode can enable state transitions between the energy states of the network. In some embodiments, the operational mode can be determined via analysis of the QoE and associated sensor data of the location via the AI/ML models, as discussed above.

In some embodiments, the QoE can be compared against a set of energy thresholds, whereby each threshold can correspond to a type of mode. For example, a QoE score between $N_1$ and $N_2$ may correspond to Turbo mode; a QoE score between $N_3$ and $N_4$ may correspond to Eco mode; and a QoE score between $N_5$ and $N_6$ may correspond to Deep Sleep mode.

By way of non-limiting example, the QoE score can indicate that there is no network activity within the location, and according to the set of patterns (from Step 402), this is predicted or in line with the determined activity patterns for the location at that time/day. For example, as discussed herein, "no activity" can refer to, but is not limited to, no users at the location and no network activity at the location, and users at the location but no network activity, and the like. Moreover, in some embodiments, "no network activity" may correspond to network activity at or below a threshold amount of network activity/traffic.

Therefore, according to the non-limiting example, engine 200 can enable the AP device 112 to enter Deep Sleep mode. Thus, for example, the Tx/Rx antennas may be throttled and/or only the ports related to the security system may be enabled. This, therefore, provides the minimum hardware configuration to satisfy the minimal networking required for the location, which provides a power savings, as discussed above.

In another non-limiting example, the QoE score indicates that not only are the all of resident users at the location, but 2 other users are there. For example, in the family of 3 (e.g., Mom, Dad, Daughter), the Daughter has 2 classmates over after school. In this example, typically, as indicated from the set of patterns, as discussed above, the network could operate at a configured Eco mode; however, due to the activities of the Daughter and her friends (e.g., they are engaging in an augmented reality (AR) experience with other friends within the metaverse), engine 200 can transition to Turbo mode. Thus, based on the collected data (from Step 404), engine 200 determined that the preset mode (e.g., Eco mode) was not a viable operational state to satisfy the current demands on the network. In some embodiments, the parameters of Eco mode may be modified so as to maintain engagement in Eco mode, however, the threshold capacity and coverage parameters may be adjusted (e.g., if the previous setting was to enable 100 Mbps, and it is determined that the Daughter and her friends need 75 Mbps more, engine 200 can adjust the Eco mode to 180 Mbps to satisfy the current need/demand—with a 5 Mbps buffer for any unpredicted traffic spikes).

In some embodiments, in line with the discussion herein, a location can be subject to and/or have corresponding network activity (e.g., at or above threshold level) despite no user being present at the location. For example, a user can remotely login to a location-based computer (e.g., a home computer, for example) from outside the location and trigger network activity that can cause a transition of power mode, as discussed herein.

Continuing with Process 400, in Step 410, engine 200 can configure the hardware components of the AP device(s) at the location based on the determined operational mode. As discussed above, such configurations can correspond to management, control and/or changes to which ports, interfaces and/or antennas are available, as well as how frequent such ports, interface and antennas, as well as processors and memory, update, communicate and/or process network based information. For example. Table 1, discussed supra, provides an example of modifications to the Tx/Rx chains of an access point (e.g., AP device 112).

And, based on the configurations of Step 410, engine 200 can perform Step 412 where the network can be provided (e.g., provisioned, enacted, initiated, modified, updated and/or made accessible, for example) according to the modified capabilities (e.g., customized network capacity and coverage, as discussed herein).

As depicted in FIG. 4, Process 400 can recursively proceed from Step 412 to Step 404, where the network traffic and/or characteristics can be monitored so as to ensure the proper network mode is currently being activated and implemented for the location. As such, the disclosed framework, via engine 200 can optimize a location's network with enough margin to accommodate/meet the QoE (usage) of the devices connected to and/or relying on the network.

According to some embodiments, a location can have a dedicated engine 200 model so that the energy management protocols applied to the location can be specific to the events and patterns learned and detected at that location. In some embodiments, the model can be specific for a user or set of users (e.g., users that live at a certain location (e.g., a house), and/or are within a proximity to each other (e.g., work on the same floor of an office building, for example)).

Figure 7:
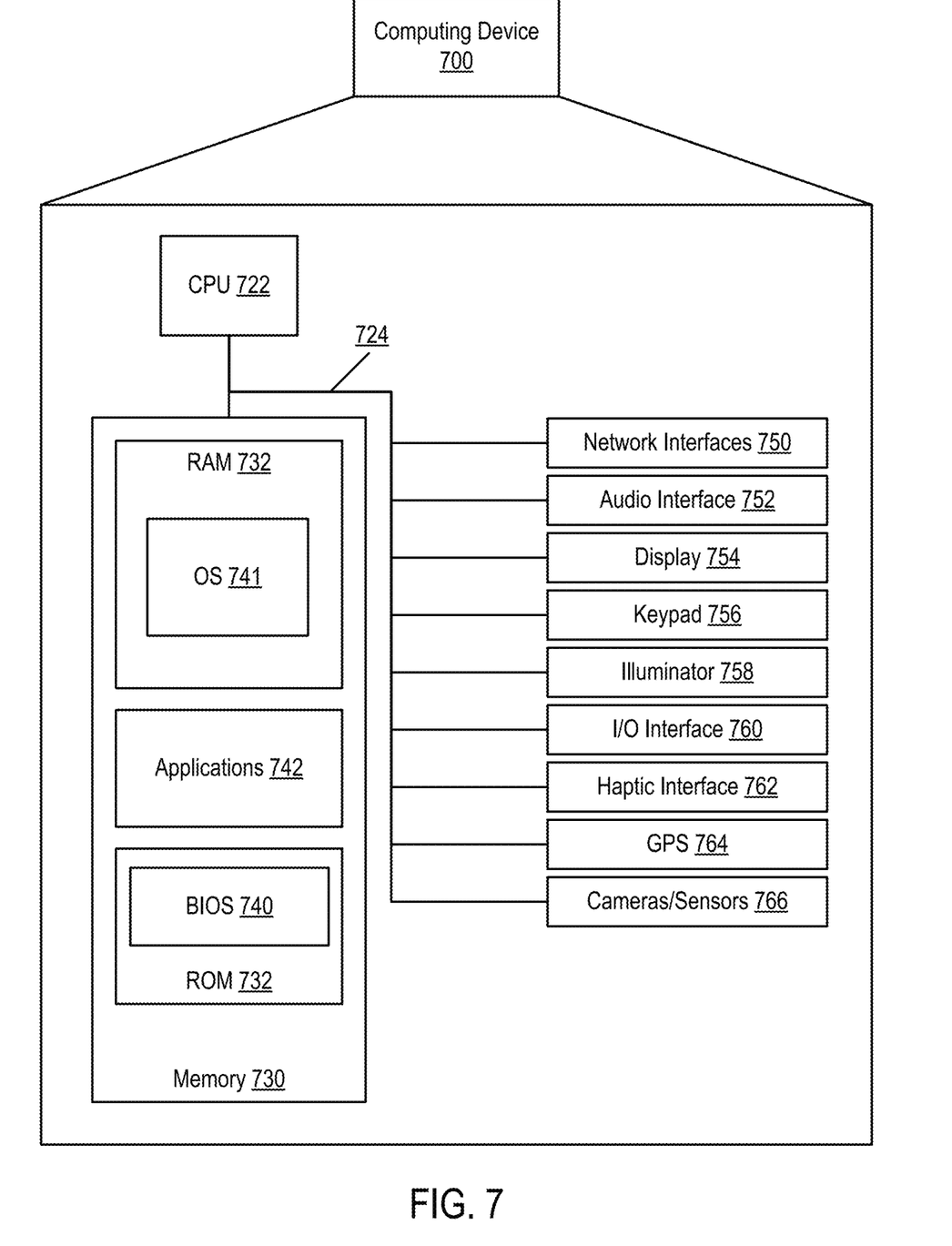
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS or the like, to further determine the physical location of client device 700 on the surface of the Earth. In one embodiment, however, Client device may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   monitoring, by a device, activity at a location, the activity corresponding to real-world and digital activity associated with at least one user of the location;
   collecting, by the device, sensor data based on the monitoring, the sensor data comprising information related to the activity;
   analyzing, by the device, the sensor data;
   determining, by the device based on the analysis, an operational mode of a network, the operational mode comprising a set of network configurations customized to network usage at the location;
   configuring, by the device, at least one access point (AP) of the network based on the operational mode, the configuration comprising modifying hardware functionality of the at least one AP in accordance with the set of network configurations of the operational mode;
   provisioning, by the device, the network for the location via the configured AP at the location.

2. The method of claim 1, further comprising:
   monitoring the provisioned network, wherein the configured AP is capable of being further configured via another operational mode based upon detection of a subsequent event.

3. The method of claim 1, further comprising:
   identifying, for the location, a set of operational modes, the set of operational modes comprising a Turbo mode, Deep Sleep mode and Eco mode, wherein:
      the Turbo mode comprises a network configuration for optimal network traffic,
      the Deep Sleep mode comprises a network configuration for optimal energy consumption of the at least one AP, and
      the Eco mode comprises a network configuration for a threshold satisfying amount network coverage and capacity while maximizing the energy consumption of the at least one AP.

4. The method of claim 1, wherein the analysis of the sensor data comprises determination of a Quality of Experience (QoE) score for the location, the QoE score providing an indication of a current demand related to network coverage and capacity at the location.

5. The method of claim 1, further comprising:
   identifying a set of patterns for a time proximate to a current time, the set of patterns corresponding to learned behavior of users at the location, wherein the monitoring of the location is based on the identified set of patterns.

6. The method of claim 5, further comprising:
   collecting activity data from a set of sensors at the location;
   analyzing the activity data;
   determining a plurality of patterns of behavior for the location; and
   storing the determined plurality of patterns of behavior, wherein the identified set of patterns are identified from the stored plurality of patterns of behavior.

7. The method of claim 5, wherein the set of patterns correspond to a preset network mode, wherein the device initially configures the network to the preset network mode upon identification of the set of patterns.

8. The method of claim 1, wherein a user device of the at least one user is connected to the network, wherein the network is provided by an access point device.

9. The method of claim 1, wherein the sensor data is based on data collected by a set of devices at the location, the set of devices comprising at least one of an access point device, user equipment, sensors and a cloud-based device.

10. The method of claim 1, wherein the device is an AP device for the location.

11. A device comprising:
a processor configured to:
monitor activity at a location, the activity corresponding to real-world and digital activity associated with at least one user of the location;
collect sensor data based on the monitoring, the sensor data comprising information related to the activity;
analyze the sensor data;
determine, based on the analysis, an operational mode of a network, the operational mode comprising a set of network configurations customized to network usage at the location;
configure at least one access point (AP) of the network based on the operational mode, the configuration comprising modifying hardware functionality of the at least one AP in accordance with the set of network configurations of the operational mode;
provision the network for the location via the configured AP at the location.

12. The device of claim 11, wherein the processor is further configured to:
monitor the provisioned network, wherein the configured AP is capable of being further configured via another operational mode based upon detection of a subsequent event.

13. The device of claim 11, wherein the processor is further configured to:
identify, for the location, a set of operational modes, the set of operational modes comprising a Turbo mode, Deep Sleep mode and Eco mode, wherein:
the Turbo mode comprises a network configuration for optimal network traffic,
the Deep Sleep mode comprises a network configuration for optimal energy consumption of the at least one AP, and
the Eco mode comprises a network configuration for a threshold satisfying amount network coverage and capacity while maximizing the energy consumption of the at least one AP.

14. The device of claim 11, wherein the analysis of the sensor data comprises a determination of a Quality of Experience (QoE) score for the location, the QoE score providing an indication of a current demand related to network coverage and capacity at the location.

15. The device of claim 11, wherein the processor is further configured to:
identify a set of patterns for a time proximate to a current time, the set of patterns corresponding to learned behavior of users at the location, wherein the monitoring of the location is based on the identified set of patterns, wherein the set of patterns correspond to a preset network mode, wherein the device initially configures the network to the preset network mode upon identification of the set of patterns.

16. The device of claim 15, wherein the processor is further configured to:
collect activity data from a set of sensors at the location, the set of sensors comprising at least one of user equipment, an access point device, a sensor and a cloud-based device;
analyze the activity data;
determine a plurality of patterns of behavior for the location; and
store the determined plurality of patterns of behavior, wherein the identified set of patterns are identified from the stored plurality of patterns of behavior.

17. A non-transitory computer-readable storage medium tangibly encoded with computer-executable instructions that when executed by the device, perform a method comprising:
monitoring, by the device, activity at a location, the activity corresponding to real-world and digital activity associated with at least one user of the location;
collecting, by the device, sensor data based on the monitoring, the sensor data comprising information related to the activity;
analyzing, by the device, the sensor data;
determining, by the device based on the analysis, an operational mode of a network, the operational mode comprising a set of network configurations customized to network usage at the location;
configuring, by the device, at least one access point (AP) of the network based on the operational mode, the configuration comprising modifying hardware functionality of the at least one AP in accordance with the set of network configurations of the operational mode;
provisioning, by the device, the network for the location via the configured AP at the location.

18. The non-transitory computer-readable storage medium of claim 17, further comprising:
monitoring the provisioned network, wherein the configured AP is capable of being further configured via another operational mode based upon detection of a subsequent event.

19. The non-transitory computer-readable storage medium of claim 17, further comprising:
identifying, for the location, a set of operational modes, the set of operational modes comprising a Turbo mode, Deep Sleep mode and Eco mode, wherein:
the Turbo mode comprises a network configuration for optimal network traffic,
the Deep Sleep mode comprises a network configuration for optimal energy consumption of the at least one AP, and
the Eco mode comprises a network configuration for a threshold satisfying amount network coverage and capacity while maximizing the energy consumption of the at least one AP.

20. The non-transitory computer-readable storage medium of claim 17, wherein the analysis of the sensor data comprises a determination of a Quality of Experience (QoE) score for the location, the QoE score providing an indication of a current demand related to network coverage and capacity at the location.

* * * * *